Sept. 19, 1933.  R. W. COWAN  1,927,337
ELECTRIC GAUGE
Filed Oct. 27, 1932   4 Sheets-Sheet 3
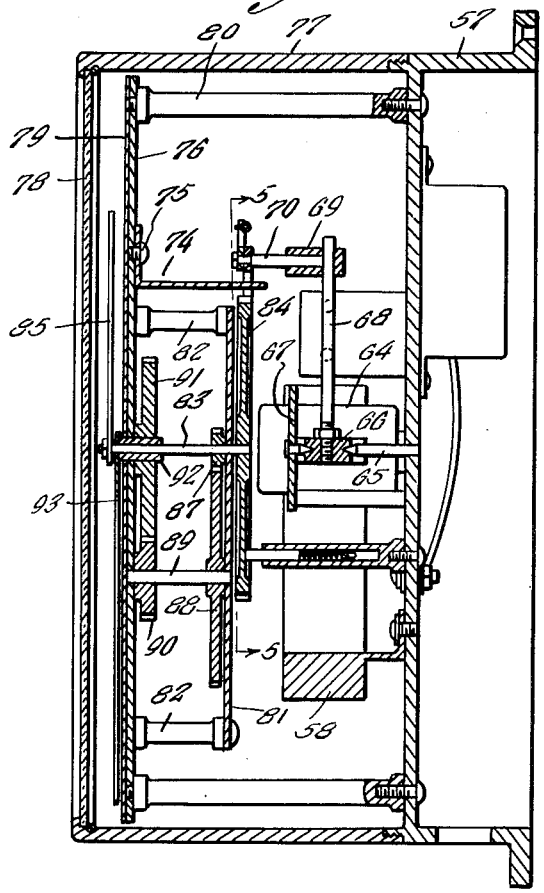
Fig. 4.
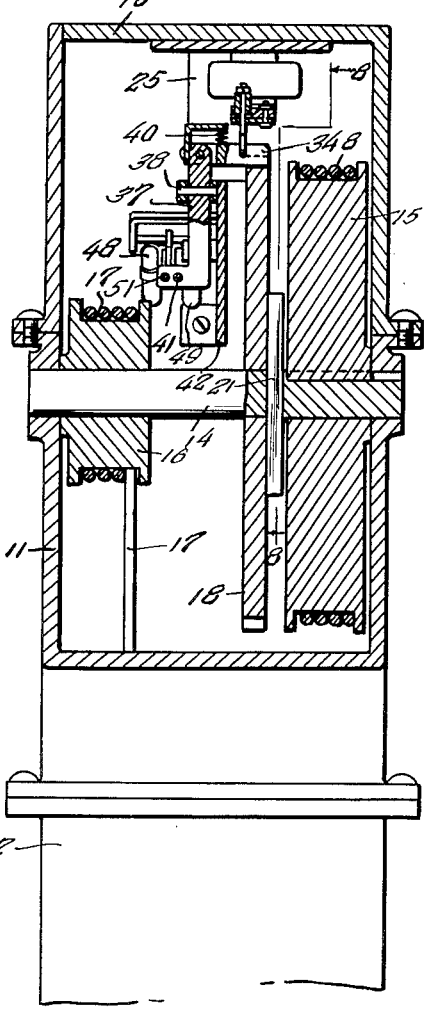
Fig. 6.
Fig. 5.
Inventor
Rich W. Cowan
By Clarence A. O'Brien
Attorney

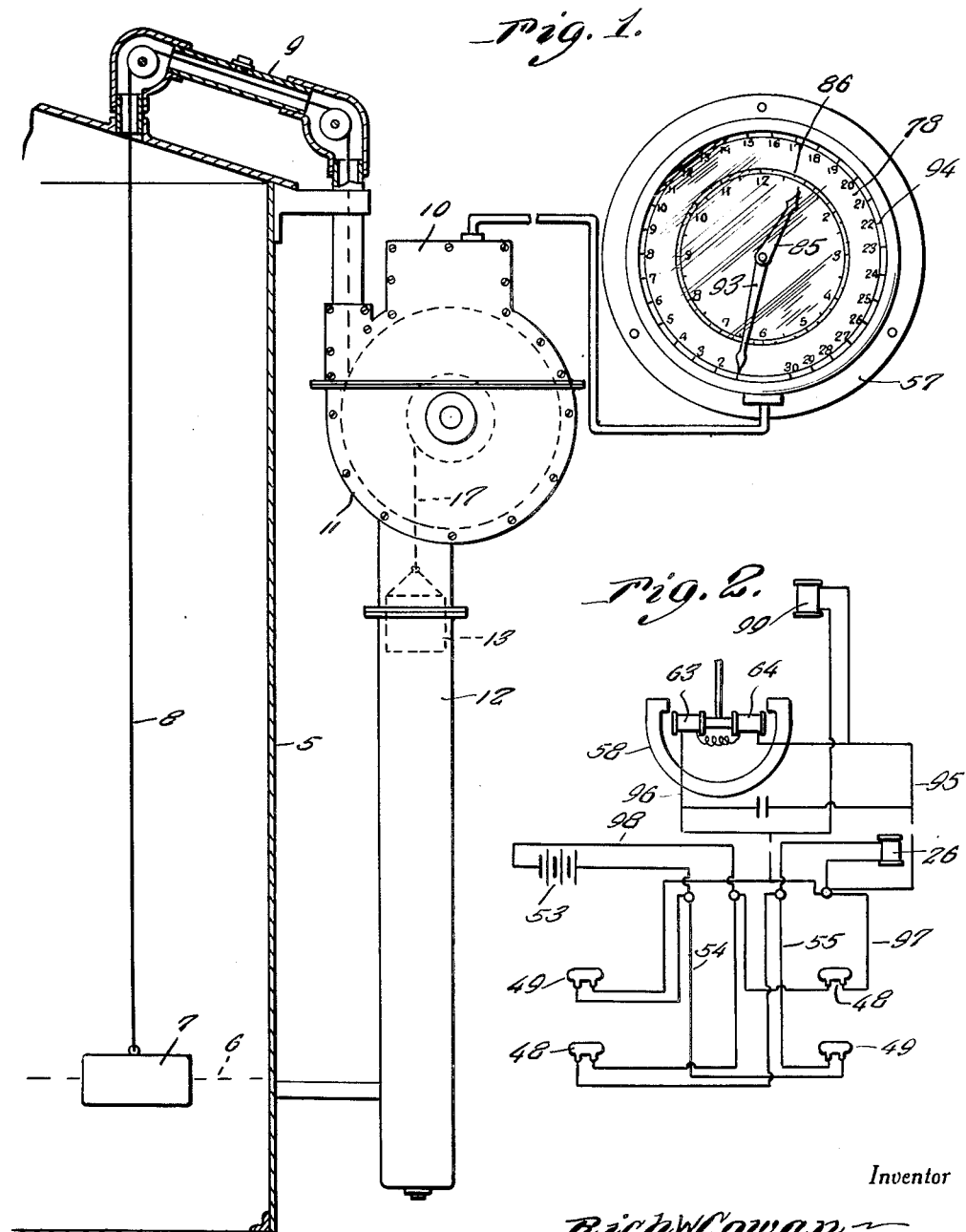

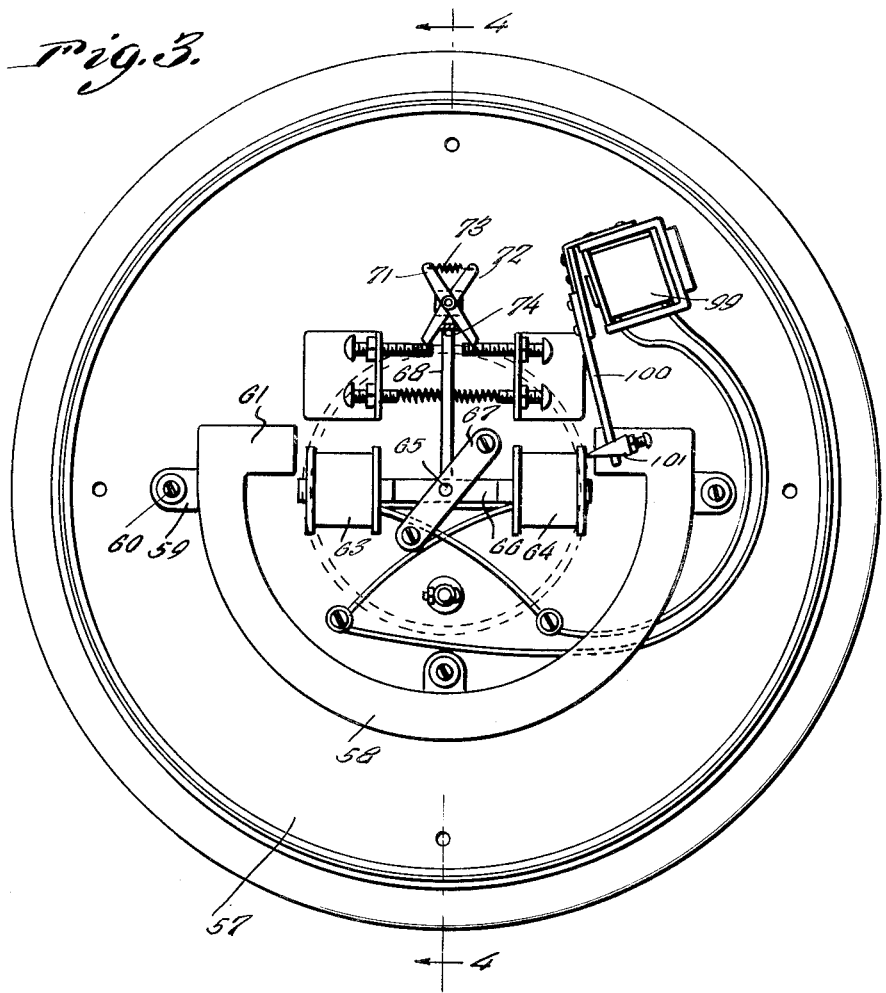
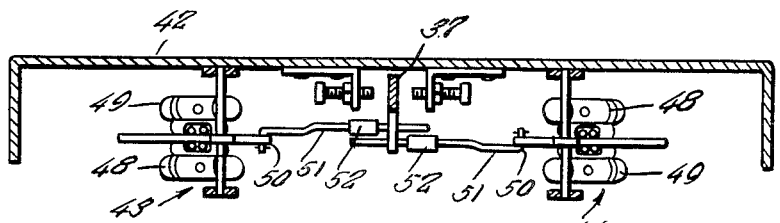

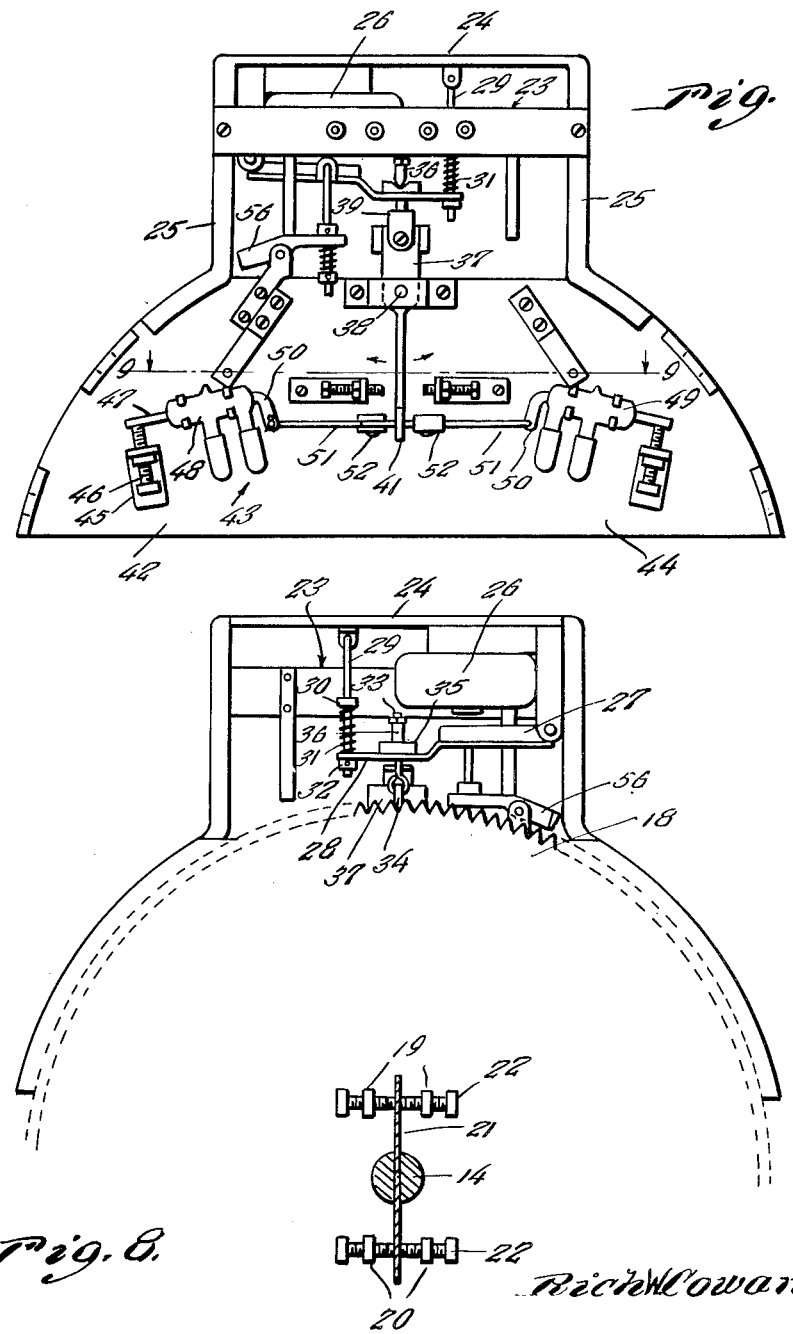

Patented Sept. 19, 1933

1,927,337

UNITED STATES PATENT OFFICE 1,927,337

ELECTRIC GAUGE

Rich W. Cowan, Comyn, Tex.

Application October 27, 1932. Serial No. 639,894

5 Claims. (Cl. 200—1)

This invention appertains to new and useful improvements in gauges, and more particularly to an automatic gauge for registering the contents of a reservoir, the same being an improvement on my co-pending application, Serial No. 606,057, filed April 18, 1932, on electrical gauges.

An important object of the present invention is to provide a novel gauging mechanism especially adapted for measuring the contents of a reservoir or tank, wherein the indicating means may be situated at a point remote in relation to the reservoir.

Another important object of the invention is to provide a gauging mechanism employing a transmitting unit and a registering unit, wherein the transmitting unit is employed for transmitting electrical impulses to the registering unit which is operated thereby.

During the course of the following specification and claims, other important objects and advantages of the invention will become apparent to the reader.

In the drawings:—

Figure 1 represents a side elevational view of the entire mechanism and its relation to a tank or reservoir.

Fig. 2 represents a diagrammatic view disclosing the electrical connections between the electrical devices involved including both the transmitting unit and registering unit.

Fig. 3 represents a top plan view of the registering unit.

Fig. 4 represents a vertical sectional view taken substantially on line 4—4 of Fig. 3.

Fig. 5 represents a sectional view taken substantially on line 5—5 of Fig. 4.

Fig. 6 represents a fragmentary vertical sectional view through the transmitting unit.

Fig. 7 represents a side elevational view of the switching means of the transmitting mechanism.

Fig. 8 represents a sectional view taken substantially on line 8—8 of Fig. 6, with the hood removed.

Fig. 9 represents a sectional view taken substantially on line 9—9 of Fig. 7.

Referring to the drawings wherein like numerals designate like parts, it can be seen in Fig. 1, that numeral 5 represents the tank or reservoir containing a body 6 of liquid upon which the float 7 operates. Extending from the float 7 is the cable 8 which is trained through the conduit 9. The conduit 9 is secured at one end to the top of the tank 5 and at its other end to the hood 10 of the casing 11. Extending from the casing 11 is the vertical depending tube 12 in which the counter-balance 13 operates.

Now referring to Fig. 6, it can be seen that journalled through the casing 11 is the shaft 14 on which the large pulley 15 and small pulley 16 are located and suitably secured. The cable 8 aforementioned, is trained into the hood 10 and over the drum 15 in the manner substantially shown in Fig. 6, while wound on the drum 16 is the cable 17 which connects to the counter-balance 13.

Obviously, as the float 7 rises in the tank 5, the counter-balance 13 lowers and of course there is a consequent movement of the drums 15 and 16.

Free on the shaft 14 is the toothed wheel 18 which as shown in Fig. 8 has two pair of lugs 19—19 and 20—20 projecting laterally therefrom.

A leaf spring 21 is disposed through an opening in the shaft 14 and has its ends projecting between the lugs 20—20 and 19—19 in the manner shown in Fig. 8. Each lug 19—19 and 20—20 is provided with a set screw 22 and these are fed inwardly to bear against opposite sides of the leaf spring 21 as shown clearly in Fig. 8. This affords a flexible connection between the wheel 18 and the shaft 14 and also affords adjustability.

The switching mechanism is generally referred to by numeral 23 and this involves a frame consisting of the bridge piece 24 and vertical member 25.

Numeral 26 represents an electro-magnetic coil secured to the bridge piece 24 and in the magnetic field of this coil 26 is the armature 27, carrying an arm 28 projecting outwardly therefrom.

The free end portion of this arm 28 has an opening therein for receiving the swingable pin 29 which has a stop member 30 thereon between which and the arm 28 a coiled compressible spring 31 is interposed, the lower end of the pin 29 below the arm 28 being provided with a stop collar 32.

Inwardly of this aforementioned opening is a second opening in the arm 28 and extending vertically through this is the eye member 33, the eye of which is disposed through an opening in the trigger 34. The upper end of this eye member 33 is equipped with a nut between which and a block 35 on the arm 28 is located a sleeve 36 which is beveled at its lower end to permit a rocking motion of the eye member 33.

In Figs. 6 and 7, it can be seen that numeral 37 represents a rocker having the pin 38 as its fulcrum point, and at the upper end of this rocker arm is an angle member 39 having one end portion disposed horizontally with a coiled compressible spring 40 interposed between the same and the trigger 34, for normally urging the trigger downwardly between the teeth of the wheel 18, this trigger being pivotally connected to the upper end of the rocker 37 as shown in Fig. 6.

As is apparent in Fig. 6, the lower end of the rocker 37 is equipped with a foot 41 which has a pair of openings therein.

The side members 25—25 have a depending plate 42 upon which the mercury dual switch assemblies 43—44 are mounted. Adjacent each assembly 43—44 is located a bracket 45 having an outstanding portion through which a set screw 46 is threaded to act as an adjustable stop against which the protuberance 47 on the corresponding switch assembly can engage. As is apparent in Fig. 9, each assembly 43—44 involves a pair of mercury switch bulbs 48—49 in which are located the usual contacts and mercury deposits.

From each assembly projects a downward arm 50 having an opening in its extremity for receiving the laterally bent end of the corresponding connecting rod 51 which is disposed through one of the openings aforementioned in the foot 41 of the rocker 37. An abutment 52 is located on each of the connecting rods 51 inwardly of the extremity thereof and when in operation, the foot 41 engages against the abutment and in continuing its motion tips the corresponding switch assembly 43 or 44.

By examining Fig. 2, it can be seen that when the switch 49 (considering the assembly 44 being operated) is closed, current will travel from the battery 53 along the conductor 54 and by way of the switch 49 and conductor 55 to the aforementioned magnetic coil 26, which in being energized will attract the armature 27. Of course, this energization of the coil 26 is pursuant to the motion of the wheel 18 which carries with it a short distance the trigger 34, resulting in the aforedescribed rocking motion of the rocker 37 and the tilting of the switch assembly 44. Obviously, the trigger 34 must be removed, and it is this energization of the coil 26 which attracts the armature 27 and lifts one end of the pawl 56, compelling its opposite end to move downwardly between the teeth of the wheel to secure the wheel against rotation.

Now referring to the description of the register, it can be seen in Fig. 3, that numeral 57 represents a base upon which the horse shoe type magnet 58 is secured by ears 59 and screws 60.

Numerals 61—62 represent inward protuberances on the opposite poles of the magnet 58 in off-set relation to which are located the coils 63—64.

Numeral 65 represents a pin to which the bar 66 is secured, the pin being revolvable on the support 67. This bar 66 supports the coils 63—64 and from the same, extends the bar 68 at right angles thereto, the same at its outer end being provided with a socket structure 69 (see Fig. 4) from which extends the pin 70, pivotally connecting together a pair of fingers 71—72 in an X-formation. The outer ends of these fingers 71—72 are connected by an extensible coiled spring 73 while the inner ends are pointed and are tensioned by the coil spring 73 against the bracket extension 74, the latter being secured as at 75 to the back side of the dial 76.

Referring to Fig. 4, it can be seen that attached to the base 57 is a cylindrical casing 77 having a glass windowed front 78. Inwardly of this window 78 is the dial plate 79 secured by the spacers 80 in spaced relation from the base 57.

A plate 81 is secured in spaced relation to the back side of the dial plate 79 by spacers 82 and journalled through the plate 81 and dial 79 is the shaft 83, the inner end of which is provided with the toothed wheel 84, having the same number of teeth thereon as the toothed wheel 18 in the transmitting mechanism disclosed in Fig. 8.

The outer end of the shaft 83 in front of the dial plate 79 has the hand 85 which moves in front of the inches reading 86 on the front of the dial 79. (See Fig. 1.)

On the shaft 83 is the pinion 87 meshing with the large gear 88 on the shaft 89. On this shaft 89 is a pinion 90 meshing with the gear 91 on the bushing 92 which surrounds the shaft 83 and projects through the dial plate 79. To the outer end of this bushing 92 is secured the long hand 93 which travels over the feet reading 94 on the outer side of the dial plate 79.

As is clearly shown in Fig. 2, current passes from the coil 26 by way of the conductor 95 to the coils 64—63 and back by way of the conductor 96 and conductor 97, through the return switch 48 to the conductor 98 which forms the opposite side of the battery.

The same operation takes place if the switch assembly 43 in Fig. 7 is energized, excepting that the coils 63—64 are energized at a reverse polarity, causing the coil 63 to lift and obviously to actuate the finger 71 to move the wheel 84 in the reverse direction.

Across the coils 63—64 is the coil 99, as clearly shown in Fig. 3, and this, when the coil 63 or 64 is energized, actuates the armature 100. The armature is provided with a movable or adjustable wedge 101 which engages in the teeth of the wheel 84.

Obviously, each impulse of current delivered by the transmitting mechanism is taken up by the gauge and registered by the gauge.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A switch of the character described comprising a toothed wheel, a rocker, a member projecting from the rocker for disposition between the teeth, said rocker being provided with an opening therein, a tiltable mercury switch, a connecting rod extending from the switch and being slidably disposed through the opening in the rocker, and an abutment on the connecting rod against which the rocker can engage.

2. A switch of the character described comprising a toothed wheel, a rocker, a member projecting from the rocker for disposition between the teeth, said rocker being provided with an opening therein, a tiltable mercury switch, a connecting rod extending from the switch and being slidably disposed through the opening in the rocker, an abutment on the connecting rod against which the rocker can engage, and adjustable limiting means for the rocker.

3. A switch of the character described comprising a toothed wheel, a rocker, a member projecting from the rocker for disposition between the teeth, said rocker being provided with an opening therein, a tiltable mercury switch, a connecting rod extending from the switch and being slidably disposed through the opening in the rocker, an abutment on the connecting rod against which the rocker can engage, and locking means for the toothed wheel, responsive to the action of the rocker.

4. A switch of the character described comprising a toothed wheel, a rocker, a member projecting from the rocker for disposition between the teeth, said rocker being provided with an opening therein, a tiltable mercury switch, a connecting rod extending from the switch and being slidably disposed through the opening in the rocker, an abutment on the connecting rod against which the rocker can engage, said member on the rocker being yieldable outwardly of the teeth, and spring means for urging the said yieldable member into the teeth of the wheel.

5. A switch of the character described comprising a toothed wheel, a rocker, a member projecting from the rocker for disposition between the teeth, said rocker being provided with an opening therein, a tiltable mercury switch, a connecting rod extending from the switch and being slidably disposed through the opening in the rocker, an abutment on the connecting rod against which the rocker can engage, locking means for the toothed wheel, responsive to the action of the rocker, and said locking means also being operative to lift the yieldable member from the teeth of the wheel when the locking means is in operated position.

RICH W. COWAN.